United States Patent
Thatcher et al.

(10) Patent No.: US 11,443,208 B2
(45) Date of Patent: Sep. 13, 2022

(54) ASSESSMENT OF INCONSISTENT STATEMENTS TO A RECIPIENT GROUP

(71) Applicant: International Business Machines Corporation, Armonk, NY (US)

(72) Inventors: Sean Thomas Thatcher, Stone Ridge, VA (US); Edward Graham Katz, Washington, DC (US); Charles E. Beller, Baltimore, MD (US); John A. Riendeau, Madison, WI (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 16/823,534

(22) Filed: Mar. 19, 2020

(65) Prior Publication Data

US 2021/0295178 A1 Sep. 23, 2021

(51) Int. Cl.
*G06F 17/00* (2019.01)
*G06N 5/04* (2006.01)
*G06F 40/20* (2020.01)
*G06N 20/00* (2019.01)

(52) U.S. Cl.
CPC .............. *G06N 5/04* (2013.01); *G06F 40/20* (2020.01); *G06N 20/00* (2019.01)

(58) Field of Classification Search
CPC .......... G06F 40/30; G06F 40/20; G06F 16/36; G06F 17/28; G06F 17/2785; H04L 51/224; H04L 51/52
USPC .......................................................... 704/9
See application file for complete search history.

(56) References Cited

U.S. PATENT DOCUMENTS

| | | | |
|---|---|---|---|
| 7,313,515 B2 | 12/2007 | Crouch et al. | |
| 9,483,159 B2 | 11/2016 | Myslinski | |
| 9,886,726 B1 | 2/2018 | Gauvin | |
| 9,892,109 B2 | 2/2018 | Myslinski | |
| 2014/0188461 A1* | 7/2014 | Myslinski | G06F 17/28 704/9 |
| 2016/0085744 A1* | 3/2016 | Dunn | G06F 17/2785 704/9 |
| 2017/0199882 A1 | 7/2017 | Byron et al. | |
| 2022/0075958 A1* | 3/2022 | Zeng | G06F 40/30 |

OTHER PUBLICATIONS

"System and Method for Fact and Consistency Checking of Digital Communications Using Big Data," IP.com, IPCOM000233765D, Dec. 19, 2013, 3 pages.

Tam, Nguyen Thanh et al., "From Anomaly Detection to Rumour Detection using Data Streams of Social Platforms," Proceedings of the VLDB Endowment 12.9 (2019): 1016-1029.

(Continued)

*Primary Examiner* — Md S Elahee
(74) *Attorney, Agent, or Firm* — Lieberman & Brandsdorfer, LLC

(57) ABSTRACT

Embodiments are provided that relate to a computer system, a computer program product, and a machine-implemented method for assessing a statement by an entity to a recipient group, particularly in a social media environment, for an inconsistency with a previous (historical) statement to the same recipient group, and notifying the entity of the inconsistency. In certain embodiments, an alternative statement is provided.

20 Claims, 11 Drawing Sheets

(56) References Cited

OTHER PUBLICATIONS

Kumar and Geethakumari, "Detecting Misinformation in Online Social Networks using Cognitive Psychology," Human-Centric Computing and Information Sciences 4.1 (2014): 14, http://www.hcis-journal.com/content/4/1/14.
Kinsora, Alexander, et al., "Creating a Labeled Dataset for Medical Misinformation in Health Forums," 2017 IEEE International Conference on Healthcare Informatics, IEEE Computer Society, 2017, pp. 456-461.
Vrij, Aldert, "Why Professionals Fail to Catch Liars and How They Can Improve", Legal and Criminological Psychology 9, No. 2, 2004, pp. 159-181.
Ritter, A., et al., "It's a Contradiction—No, it's Not: A Case Study using Functional Relations", Proceedings of the Conference on Empirical Methods in Natural Language Processing, pp. 11-20, Association for Computational Linguistics, 2008.
Marneffe, M., et al., "Finding Contradictions in Text", Proceedings of ACL-08: HLT (2008), pp. 1039-1047.
Shih, C., et al., "Validating Contradition in Texts Using Online Co-Mention Pattern Checking", ACM Transactions on Asian Language Information Processing (TALIP), vol. 11, No. 4, Article 17, Dec. 2012.
Li, L., et al., "Contradition Detection with Contradition-Specific Word Embedding", Algorithms 2017, 10, 59 (2017).

* cited by examiner

ASSESSMENT OF INCONSISTENT STATEMENTS TO A RECIPIENT GROUP

BACKGROUND

The present embodiments relate to a system, computer program product, and method for assessing a statement by an entity to a recipient group comprising one or more recipients, particularly in a social media environment, for an inconsistency with a previous or historical statement to the same recipient group, and notifying the entity of the inconsistency. In certain embodiments, an alternative statement is provided.

Natural human interaction involves maintaining different discourses with different groups of recipients. For example, a person may tell a first group of one or more recipients a first version of the truth (e.g., telling family members that "I spent the weekend with my children") that departs from a second version of the truth told to a second group of one or more recipients (e.g., telling colleagues that "I was able to ski the advanced slopes over the weekend by placing my children in ski school"). In some instances, the differences in the respective versions can lead to incomplete information being provided to the recipient(s) of one of the groups or seemingly disparate information being provided to the recipients of different groups. This problem can be compounded in a social media environment, where a person may engage in different conversations with multiple groups over a short time span.

SUMMARY

The embodiments include a system, a computer program product, and a method for assessing a statement by an entity targeting a recipient group, particularly in a social media environment, for an inconsistency with a previous (historical) statement made by the same entity targeting the same recipient group, and notifying the entity of the inconsistency.

In one aspect, a computer system includes a processing unit, e.g. processor, a match manager, and an artificial intelligence (AI) platform in communication with the processing unit. The processing unit is operatively coupled to memory and one or more tools to receive a statement targeting a first recipient group and to access a corpus of historical statements. The corpus of historical statements comprises at least one first historical statement addressed to a first recipient group, at least one second historical statement addressed to a second recipient group not targeted by the received statement, and optionally at least one third historical statement addressed to a third recipient group, at least one recipient of which is not targeted by the received statement. The match manager operates to determine a match between the first recipient group targeted by the received statement and the first recipient group to which the at least one first historical statement is addressed and select the at least one first historical statement based on the match. The match manager further operates to determine an absence of a match between the first recipient group targeted by the received statement and the second recipient group to which the at least one second historical statement is addressed and disregard the at least one second historical statement based on the absence of the match. Optionally, the match manager determines that the third recipient group satisfies a commonality threshold with the first recipient group and optionally selects the third historical statement based on satisfaction of the commonality threshold. Optionally, the match manager identifies at least one historical cross-statement between the first recipient group and the third recipient group satisfying the commonality threshold and optionally selects the historical cross-statement. The AI platform includes a natural language (NL) manager to apply natural language processing (NLP) to the received statement targeting the first recipient group, the selected at least one first historical statement, optionally the at least one third historical statement, and optionally the at least one historical cross-statement to generate corresponding content data. The AI platform further includes an AI manager to assess the content data corresponding to the received statement for an inconsistency with the content data corresponding to the selected at least one first historical statement, the optionally selected at least one third historical statement, the optionally selected at least one historical cross-statement, or any combination thereof. The AI platform further includes a director to provide a notification of the inconsistency.

In another aspect, a computer program product is provided, the computer program product comprising a computer readable storage medium having program code embodied therewith. The program code is executable by a processor to receive from an entity a statement targeting a first recipient group and access a corpus of historical statements. The corpus of historical statements comprises at least one first historical statement addressed to the first recipient group, at least one second historical statement addressed to a second recipient group not targeted by the received statement, and optionally at least one third historical statement addressed to a third recipient group, at least one recipient of which is not targeted by the received statement. A match is determined between the first recipient group targeted by the received statement and the first recipient group to which the at least one first historical statement is addressed, and the at least one first historical statement is selected based on the match. Absence of a match between the first recipient group targeted by the received statement and the second recipient group to which the at least one second historical statement is addressed is determined, and responsive to this determination the at least one second historical statement is disregarded based on the absence of the match. Optionally, it is determined that the third recipient group satisfies a commonality threshold with the first recipient group and the third historical statement is optionally selected based on satisfaction of the commonality threshold. Optionally, at least one historical cross-statement between the first recipient group and the third recipient group satisfying the commonality threshold is identified, and in response the at least one historical cross-statement is selected. Natural language processing (NLP) is applied to the received statement, the selected at least one first historical statement, optionally the at least one third historical statement, and optionally the at least one historical cross-statement to generate corresponding content data; assess the content data corresponding to the received statement for an inconsistency with the content data corresponding to the selected at least one first historical statement, the optionally selected at least one third historical statement, the optionally selected at least one historical cross-statement, or any combination thereof. A notification of the inconsistency is provided.

In yet another aspect, a computer-implemented method is provided. The method comprises receiving a statement of an entity targeting a first recipient group and accessing, by the processor of the computer device, a corpus of historical statements. The corpus of historical statements comprises at least one first historical statement addressed to the first recipient group, at least one second historical statement addressed to a second recipient group not targeted by the received statement, and optionally at least one third historical statement addressed to a third recipient group, at least one recipient of which is not targeted by the received statement. The method further comprises determining, by the processor, a match between the first recipient group targeted by the received statement and the first recipient group to which the at least one first historical statement is addressed and selecting the at least one first historical statement based on the match. The method further comprises determining, by the processor, an absence of a match between the first recipient group targeted by the received statement and the second recipient group to which the at least one second historical statement is addressed and disregarding the at least one second historical statement based on the absence of the match. Optionally, it is determined, by the processor, that the third recipient group satisfies a commonality threshold with the first recipient group and the third historical statement is optionally based on satisfaction of the commonality threshold. Optionally, at least one historical cross-statement between the first recipient group and the third recipient group satisfying the commonality threshold is identified by the processor, and the at least one historical cross-statement is optionally selected. Natural language processing (NLP) is applied to the received statement, the selected at least one first historical statement, optionally the at least one third historical statement, and optionally the at least one historical cross-statement to generate corresponding content data. The method further comprises applying the content data to an artificial intelligence (AI) platform. The content data corresponding to the received statement is assessed for an inconsistency with the content data corresponding to the selected at least one first historical statement, the optionally selected at least one third historical statement, the optionally selected at least one historical cross-statement, or any combination thereof. A notification of the inconsistency is provided.

These and other aspects of the invention, including machines, devices, products, code, systems, methods, processes, and the like, will become more apparent from the following detailed description of exemplary embodiments, taken in conjunction with the accompanying drawings.

BRIEF DESCRIPTION OF THE SEVERAL VIEWS OF THE DRAWINGS

The drawings referenced herein form a part of the specification and are incorporated herein by reference. Features shown in the drawings are meant as illustrative of only some embodiments, and not of all embodiments, unless otherwise explicitly indicated.

DETAILED DESCRIPTION

Figure 1:
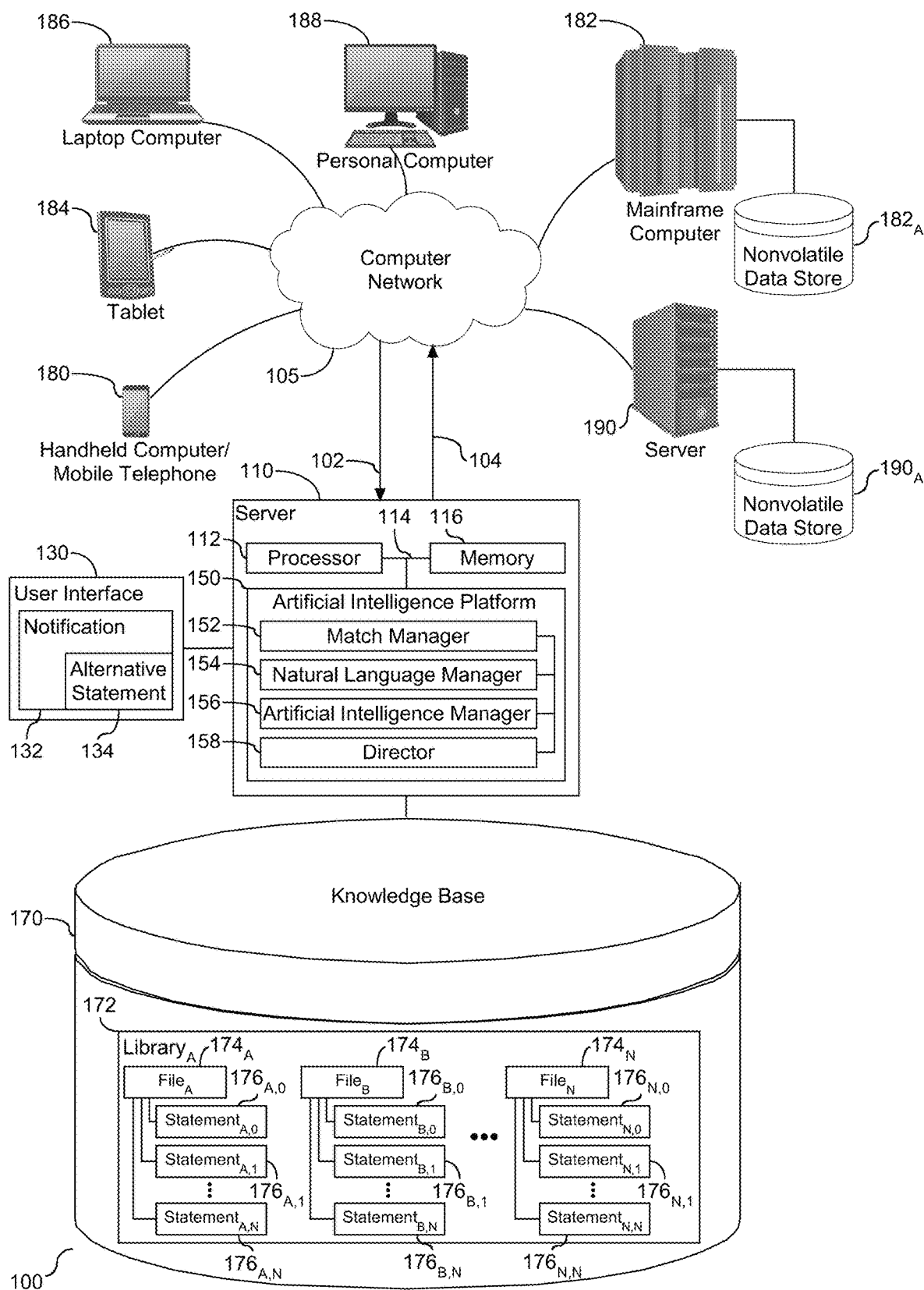
FIG. 1 depicts a system diagram illustrating a computing system in a network environment with an artificial intelligence (AI) platform.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of artificially intelligent computer systems, natural language systems (such as the IBM Watson® artificially intelligent computer system or and other natural language systems) process natural language based on acquired knowledge. To process natural language, the system may be trained with data derived from a database or corpus of knowledge, but the resulting outcome can be incorrect or inaccurate for a variety of reasons.

Machine learning (ML), which is a subset of Artificial Intelligence (AI), utilizes algorithms to learn from data and create foresights based on this data. AI refers to the intelligence when machines, based on information, are able to make decisions, which maximizes the chance of success in a given topic. More specifically, AI is able to learn from a data set to solve problems and provide relevant recommendations. Cognitive computing is a mixture of computer science and cognitive science. Cognitive computing utilizes self-teaching algorithms that use data, visual recognition, and natural language processing to solve problems and optimize human processes.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding natural language and processing content response to the identification and understanding as well as changes to the structures are extremely difficult at a practical level.

Accordingly, the exemplary embodiments of the system, the computer program product, and the method described in detail herein with the corresponding drawings focus on leveraging AI for contradiction detection, and more particularly for detection of statements made, especially on social media, to a group of one or more recipients that are inconsistent with previous statements, also referred to herein as historical statements, made to the same group of one or more recipients.

Referring to FIG. 1, a schematic diagram of an artificial intelligence (AI) platform and corresponding system (100) is depicted. As shown, a server (110) is provided in communication with a plurality of computing devices (180), (182), (184), (186), (188), and (190) across a network connection, e.g., computer network, (105). The server (110) is configured with a processing unit (112), e.g., a processor, in communication with memory (116) across a bus (114). The server (110) is shown with an AI platform (150) operatively coupled to an interface (130) and a knowledge base (170), also referred to herein as a corpus. The interface (130) may include a visual display, such as a computer screen or smartphone. While a separate visual display is illustrated in FIG. 1, it should be understood that the interface (130) may be replaced, combined with, or supplemented by other interface(s), such as an audio interface (e.g., a microphone and speaker), an audio-video interface, etc. In an embodiment, the interface (130) may be incorporated into any one or more of the computing devices (180), (182), (184), (186), (188), and (190).

The AI platform (150) is operatively coupled to the network (105) to support interaction with the server (110) and the AI platform (150) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network (105) enable communication detection, recognition, and resolution via one or more network connections, such as connections (102) and (104). Other embodiments of the server (110) may be used with components, systems, sub-systems, and/or devices other than those that are depicted herein.

As shown, the data source (170) is configured with a library (172) of files, with each file recording one or more statements, and forming a repository of historical statements. As shown, the library (172) includes a plurality of files, including $File_A$ ($174_A$), $File_B$ ($174_B$), . . . and $File_N$ ($174_N$). Although three files are shown, the quantity should not be considered limiting. Indeed, it is contemplated that the library ($172_A$) may contain tens, hundreds or thousands of files. According to an embodiment, $File_A$ ($174_A$) contains a plurality of statements (also referred to as records), including $Statement_{A,0}$ ($176_{A,0}$), $Statement_{A,1}$ ($176_{A,1}$), . . . and $Statement_{A,N}$ ($176_{A,N}$). $File_B$ ($174_B$) contains a plurality of statements, including $Statement_{B,0}$ ($176_{B,0}$), $Statement_{B,1}$ ($176_{B,1}$), . . . and $Statement_{B,N}$ ($176_{B,N}$). $File_N$ ($174_N$) contains a plurality of statements, including $Statement_{N,0}$ ($176_{N,0}$), $Statement_{N,1}$ ($176_{N,1}$), . . . and $Statement_{A,N}$ ($176_{N,N}$). The statements may be grouped into the respective files, $File_A$ ($174_A$), $File_B$ ($174_B$), or $File_N$ ($174_N$), based on various variables. In an embodiment, the statements are grouped into different files by recipient identification, e.g., the statements in $File_A$ ($174_A$) are between the user (or targeting member) and a first recipient group, the statements in $File_B$ ($174_B$) are between the user and a second recipient group, and the statements in $File_N$ ($174_N$) are between the user and a third recipient group. In another embodiment, the statements are grouped into different files by content. In another embodiment, the statements are grouped into different files by temporal metadata, such as calendar dates. Although each of the files is shown with three statements or records, the quantity should not be considered limiting. A different number of statements or records may be contained in different files. All of the statements or records may be contained in a single file or two files, or all of the statements or records may be contained in more than three files. The statements may be communications, texts, emails, instant messages, audio messages, posts, or other types of recorded statements or records. Each of the recipients can be a natural person or a juridical person, e.g., a company comprising one or more persons designated as recipients.

Although the data source (170) is shown with a single library (172), it should be understood that the data source (170) may comprise two or more libraries, including libraries located among different social networking environments, different applications, and different servers and storage media. For example, libraries may be associated with a social media website, chatroom, a messaging application (e.g., email, text, instant messaging, voice messaging, etc.), a calendar application, a list serve, a blogging site, etc.

The various computing devices (180), (182), (184), (186), (188), and (190) in communication with the network (105) may include access points to the server (110). The network (105) may include local network connections and remote connections in various embodiments, such that the AI platform (150) may operate in environments of any size, including local and global, e.g., the Internet. Additionally, the AI platform (150) serves as a back-end system that can make available a variety of knowledge extracted from or represented in documents, network accessible sources and/or structured data sources. In this manner, some processes populate the AI platform (150), with the AI platform (150) also including input interfaces to receive requests and respond accordingly.

As shown, content may be in the form of one or more statements (or "records") stored in files of the library (172) operatively coupled to the AI platform (150) via the knowledge base (170). Content users may access the AI platform (150) from the user interface (130) via a network connection or an Internet connection to the network (105), and may submit natural language input to the AI platform (150) that may effectively determine an output response related to the input by leveraging the knowledge base (170) and the tools that comprise the AI platform (150).

The AI platform (150) is shown herein with several tools to support the user interface (130), and more specifically, with the tools directed at improving performance of the user interface (130) and corresponding experience. As shown herein, the tools include a match manager (152), a natural language (NL) manager (154), an artificial intelligence (AI) manager (156), and a director (158). Although the match manager (152) is shown as a tool of the AI platform (150), as explained further below the match manager (152) optionally may not involve the application of AI.

The match manager (152) determines whether there is a match between the one or more recipients of a first recipient group targeted by the received statement and one or more recipients of the historical statements. In an embodiment, the match manager (152) determines that a match exists where the recipient(s) of the group targeted by the received statement are identical to the recipient(s) of the group to whom a historical statement is addressed, e.g., the received statement and the historical statement are addressed to the same recipient group, also referred to herein as a first recipient group. In another embodiment, the match manager (152) determines that a match is absent, which is demonstrated where the recipient(s) of the (first) recipient group targeted by the received statement differ from the recipient(s) of another recipient group, also referred to herein as a second recipient group, to whom the historical statement is addressed. In another embodiment, the match manager (152) determines that a match exists where the recipient(s) of the (first) recipient group targeted by the received statement and the recipient(s) of a (third) recipient group satisfy a commonality threshold. In still another embodiment, the match manager (152) identifies at least one historical cross-statement between the first and third recipient groups satisfying a commonality threshold. In an embodiment, the match manager (152) compares email addresses of addressee(s) to communications, which in further embodiments may or may not involve the use of AI. In another embodiment, the match manager (152) compares telephone numbers of addressee(s) to communications. In another embodiment, the match manager (152) leverages AI to determine addressee(s) based on statement content, and determines matches based on content.

The natural language (NL) manager (154) applies natural language processing (NLP) to the received statement, the selected at least one first historical statement, optionally the at least one third historical statement, and optionally the at least one historical cross-statement to generate corresponding content data. NLP enables analysis and understanding of human language by a computer. Natural Language Understanding (NLU) is a category of NLP that is directed at parsing and translating input according to natural language principles. NLP and/or NLU are leveraged to evaluate the received statement and the historical statement for corresponding content data, which may involve processing the statements into context-based word(s), phrase(s), sentence(s), or document(s).

The AI manager (156), shown herein operatively coupled to the match manager (152) and the NL manager (154), functions to assess content data corresponding to the received statement for an inconsistency with the content data corresponding to the selected at least one first historical statement, the optionally selected at least one third historical statement, the optionally selected at least one historical cross-statement, or any combination thereof. In an embodiment, the content assessment utilizes a cosine similarity analysis.

The director (158), shown herein operatively coupled to the AI manager (156) and the interface (130). According to an exemplary embodiment, the director (158) provides output in the form of a notification (132) and optionally an alternative statement (134) for readout at the user interface (130). According to an embodiment, the director (158) provides a notification of the existence of an inconsistency between the received statement and the historical statement. In an exemplary embodiment, the notification (132) is provided to the entity who targeted (e.g., had written, recorded, or dictated) the statement at the first recipient group. According to exemplary embodiments, the notification can be a pop-up text alert, an audio alert, a marking, a font change, striking through, underlining, highlighting, a proposed alternative statement, or other notice or combination of notices bringing attention of the inconsistency to the targeting entity before the contradictory statement is transmitted to the first recipient group.

According to another embodiment, the director (158) proposes an alternative statement that is consistent with one or more of the historical statements addressed to the same recipient group. The proposed alternative statement may modify the contradictory statement received from the entity by, for example, omitting one or more words from the received statement, weakening an opinion in the received statement through selection of less forceful words, replacement of conflicting content words with non-conflicting sibling or antonym terms, etc. In an embodiment, if a contradiction stemming from a specific word choice is detected, a more general word that encompasses both contradictory keywords can be searched. For example, the following three statements are received: a) I took my daughter skiing, b) I took my son skiing, and c) I took my child skiing. A more general statement as an alternative to these three statements may be in the form of the following conjunction, d) I took my daughter and son skiing. At the phrase level, a less specific paraphrase may be generated rather than less specific keywords. In an embodiment, an existing paraphrase resource, such as a paraphrase database, may be leveraged.

In some illustrative embodiments, server (110) may be the IBM Watson® system available from International Business Machines Corporation of Armonk, N.Y., augmented with the mechanisms of the illustrative embodiments described hereafter.

Types of information handling systems that can utilize the AI platform (150) range from small handheld devices, such as the handheld computer/mobile telephone (180) to large mainframe systems, such as the mainframe computer (182). Examples of handheld computer the (180) include personal digital assistants (PDAs), personal entertainment devices, such as MP4 players, portable televisions, and compact disc players. Other examples of information handling systems include pen, or the tablet computer (184), the laptop or notebook computer (186), the personal computer system (188), the and server (190). As shown, the various information handling systems can be networked together using the computer network (105). Types of computer networks (105) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., the server (190) utilizes the nonvolatile data store ($190_A$), and the mainframe computer (182) utilizes the nonvolatile data store ($182_A$). The nonvolatile data store ($182_A$) can be a component that is external to the various information handling systems or can be internal to one of the information handling systems.

The system and tools shown and described in connection with FIG. 1 are designed to be applied into a real-world application. In an embodiment, the application may be directed to a natural language processing (NLP) environment. For example, a social networking website may provide email and group email capabilities. In another example, the user may wish to email a first recipient group comprising one or more recipients composed of family members with the following message "I was able to ski the advanced slopes over the weekend by placing my children in ski school." The system and tools described herein search historical statements and find the earlier message "I spent the weekend with my children" sent to the first group composed of one or more family members, and determine that the two statements are inconsistent with one another. The system and tools in this embodiment will notify the user of the inconsistency, and in an optional embodiment propose an alternative statement for the user to send to the first group composed of one or more family members. For example, the system and tools may propose an alternative statement that "I was able to ski the advanced slopes over the weekend by taking my children with me and placing them in ski school."

An information handling system employed to support the AI platform (150) may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 2:
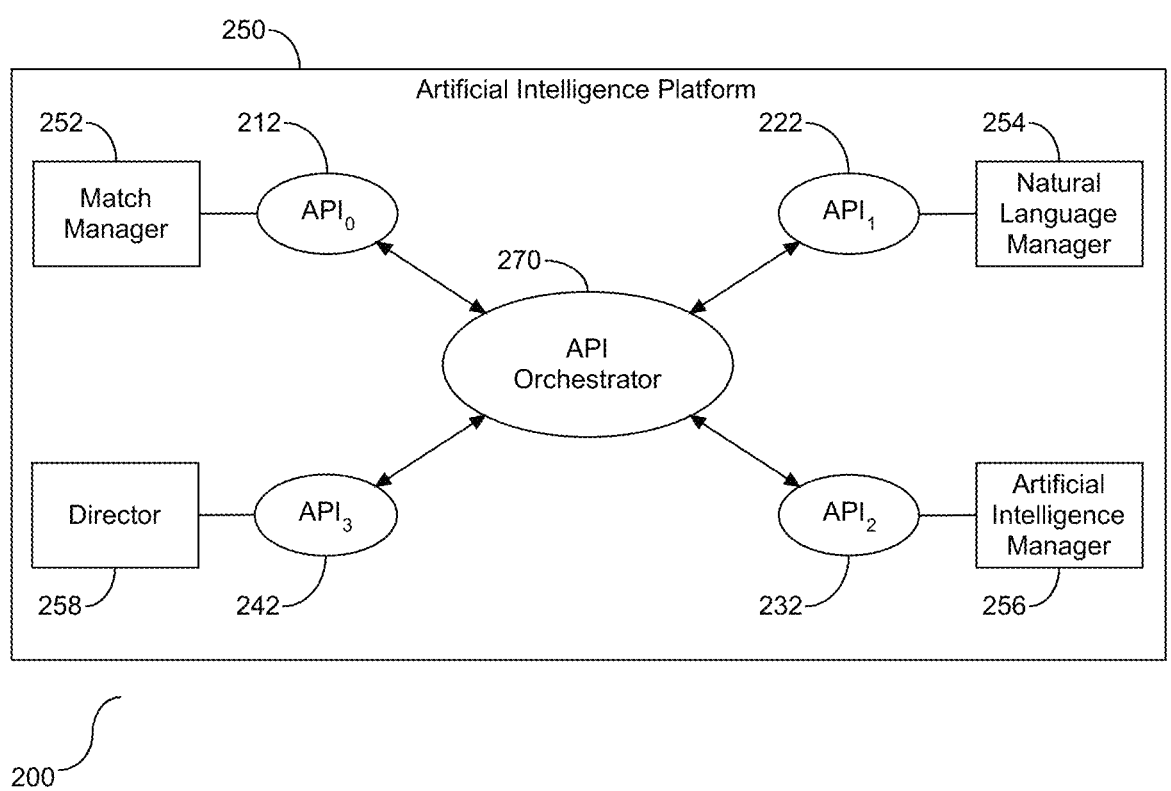
FIG. 2 depicts a block diagram illustrating AI platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152), (154), (156), and (158) and their associated functionality. Referring to FIG. 2, a block diagram (200) is provided illustrating the tools (252), (254), (256), (258) and their associated APIs. As shown, a plurality of tools are embedded within the AI platform (205), with the tools including the match manager (252) associated with $API_0$ (212), the NL manager (254) associated with $API_1$ (222), the AI manager (256) associated with $API_2$ (232), and the director (258) associated with $API_3$ (242). Each of the APIs may be implemented in one or more languages and interface specifications. $API_0$ (212) provides functional support to receive a statement targeting a recipient group, access a corpus of historical statements, and determine a match or absence of a match between the member(s) of the targeted group and the recipient group; $API_1$ (222) provides functional support to apply natural language processing (NLP) to the received statement and the historical statements; $API_2$ (232) provides functional support to determine an inconsistency (or contradiction detection) between the received statement and the historical statement(s), and $API_3$ (242) provides functional support to carry out one or more notifications and optionally provide proposed alternative statement(s).

As shown, each of the APIs (212), (222), (232), and (242) are operatively coupled to an API orchestrator (270), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3A:
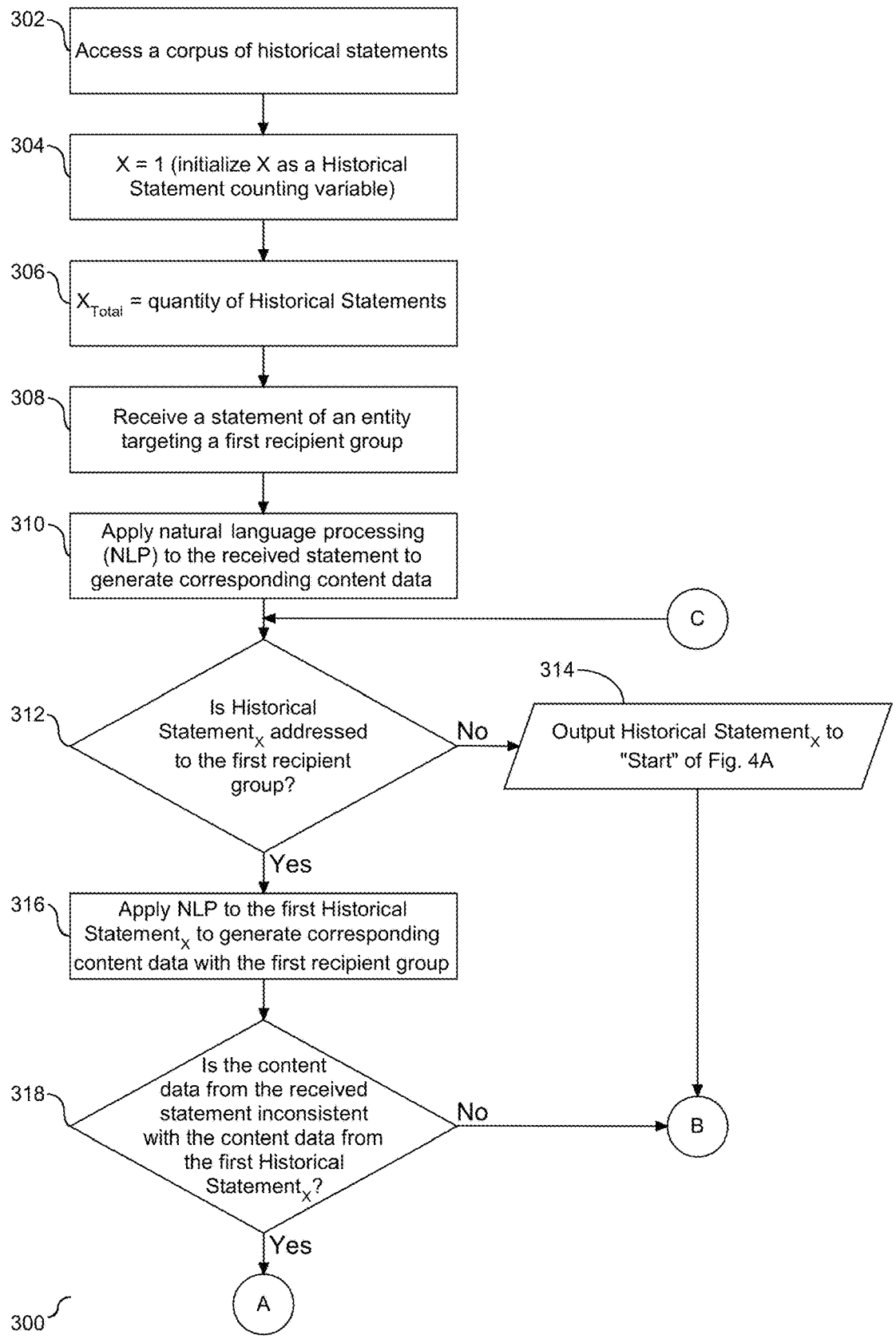
FIGS. 3A and 3B depict a flowchart illustrating an embodiment of a method of identifying an inconsistency between content data corresponding to a received statement and content data corresponding to a first historical statement, and providing notification of the inconsistency.
Figure 3B:
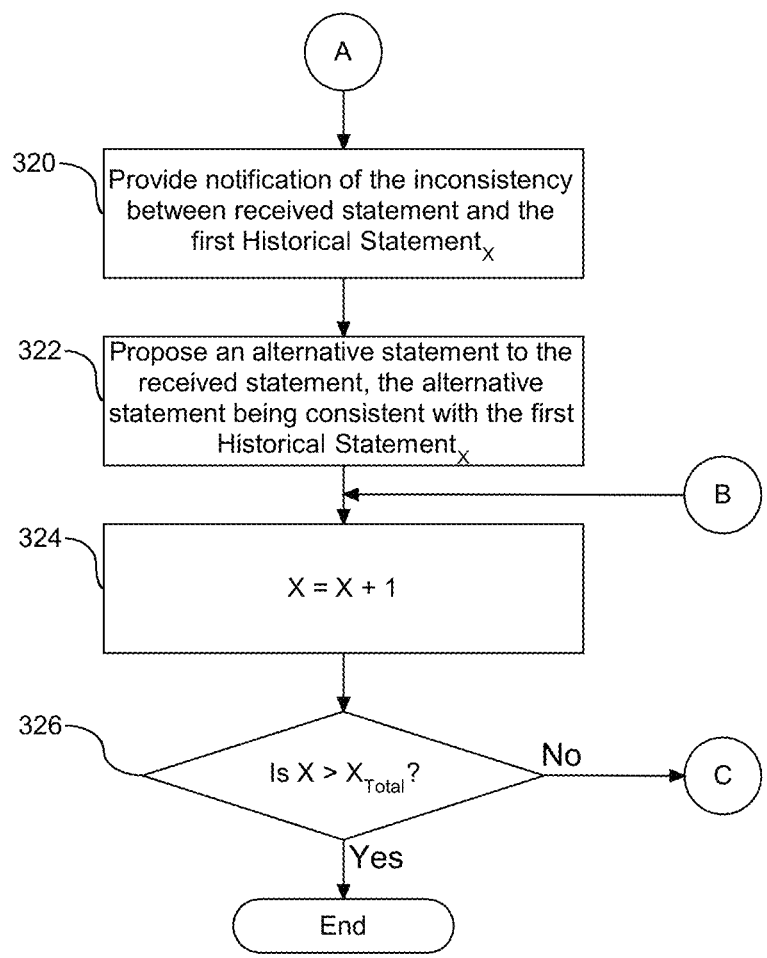

Referring to FIGS. 3A and 3B, a flowchart (300) is provided to illustrate a machine-implemented process, also interchangeably referred to herein as a method, for receiving, from an entity such as a user, a statement targeted to a first recipient group and subjecting the received statement to contradiction detection (CD) with one or more historical statements (also referred to herein as records) addressed to the same first recipient group and one or more historical statements addressed to a different recipient group, also referred to as a second recipient group. In an exemplary embodiment, the received statement is directed to a social media environment, such as a social media website, chatroom, a messaging application (e.g., email, text, instant messaging, voice messaging, etc.), a list serve, a blogging site, etc.

As shown, in step (302) a corpus of historical statements from a knowledge base, or data set, is accessed. In an embodiment, the corpus of historical statements is part of the social media environment used for presenting the statement targeting the first recipient group. In an alternative embodiment, the corpus of historical statements is different than the social media environment used for presenting the statement targeting the first recipient group. The corpus or data set may be, for example, a library or database associated with a social media platform, a library or database associated with a messaging (e.g., texting, email) service, a library or database associated with a calendar, etc. The corpus of historical statements may include, for example, one or more of the following: at least one first historical statement by the entity addressed to the first recipient group targeted by the received statement of the entity; at least one second historical statement by the entity addressed to a second recipient group not targeted by the received statement of the entity; at least one third historical statement by the entity addressed to a third recipient group, at least one recipient not targeted by the received statement of the entity (that is, the recipient of the third recipient group does not belong to the first recipient group); or any combination comprising one or more of the foregoing. In the context of the example given in the Background section, the first recipient group comprises one or more family members, the second recipient group comprises one or more colleagues, and the third recipient group comprises one or more friends. In an embodiment, any recipient group may include a single member or recipient (i.e., a singular group). In another embodiment, any recipient group may include two or more members or recipients (i.e., a plural group).

A variable, X, is employed to represent a historical statement counting variable for historic statements contained in a data set, e.g., the knowledge base (170) of FIG. 1. Following step (302), the historical statement counting variable is initialized (304). In addition, the quantity of historical statements in the data set is pre-counted, and the total number (e.g., an integer value) of historical statements is assigned to the variable $X_{Total}$ in step (306).

It is understood in the art of electronic communications that an electronic statement includes one or more designated recipients. At such time as a statement is received, typically from a user entity, the targeted recipient group is identified (308). In one embodiment, the received statement targets (e.g., is addressed to) the first recipient group, but does not target the second recipient group. For example, in the example given in the Background section, the statement of step (308) may target a first recipient group comprising one or more family members but may not target a second recipient group comprising one or more colleagues. Natural language processing (NLP) is applied to the received statement at step (310) to generate content data corresponding to the received statement. Natural Language Processing (NLP)

is a field of AI that functions as a translation platform between computer and human languages. More specifically, NLP enables computers to analyze and understand human language. Natural Language Understanding (NLU) is a category of NLP that is directed at parsing and translating input according to natural language principles. As shown and described herein, NLP and NLU are leveraged to evaluate the received statement and the historical statement(s) for content. The received statement and the historical statement(s) (discussed below) are effectively processed into context-based word(s), phrase(s), sentence(s), or document(s).

Following the NLP at step (310), the received statement is processed with respect to the historical statement(s), and more specifically to the corresponding recipient group. More specifically, a decision is made whether a match exists between the first recipient group targeted by the received statement and the recipient(s) to whom the Historical Statement$_X$ is addressed (312). Step (312) may be performed with or without the use of AI and an AI platform, such as the AI platform (150) of FIG. 1. In an embodiment, the recipient(s) of the received and historical statements are the addressee(s) identified with respect to metadata of the messaging application. In another embodiment, the recipient(s) of the received and historical statements may be determined using NLP with respect to content of the statements.

If an affirmative decision is made, i.e., if the Historical Statement$_X$ is addressed to the recipients of the first recipient group, the process continues to step (316), as discussed below. If at step (312) it is determined that there is an absence of a match between the first recipient group targeted by the received statement and the recipient(s) to whom the Historical Statement$_X$ is addressed, such as in the case of a historical statement addressed to the second recipient group, the Historical Statement$_X$ is generated as output (314) and disregarded for the purposes of FIGS. 3A and 3B and the process proceeds to identify an inconsistency between content data corresponding to the received statement and content data corresponding to a third historical statement, as shown and described below in FIGS. 4A and 4B. At step (316) (NLP) is applied to the first Historical Statement$_X$ to generate content data corresponding to the first Historical Statement$_X$.

Following step (316), a decision is made whether the content data corresponding to the received statement is inconsistent with the content data corresponding to the first Historical Statement$_X$ (318). Contradiction detection (CD) decisions, such as according to step (318), can be made leveraging existing technologies such as an AI platform or may involve a human-in-the-loop technique. According to an embodiment, the received statement and Historical Statement$_X$ are encoded in a vector-based representation like TF-IDF. The encoded statement is treated like a query and the Historical Statement$_X$ is evaluated using, for example, cosine similarity analysis. According to another embodiment, content words in the received statement are identified, an antonym lexicon is consulted to retrieve contradictory content word(s), and the Historical Statement$_X$ is searched for the presence of one or more of the contradictory content words or negation. The described embodiments may be applied to other contradiction detection decision steps, such as at steps (414) and (510) of FIGS. 4A and 5A, respectively, discussed below.

If the decision at step (318) is answered in the negative, the process proceeds to step (324), discussed below. However, if the decision is answered in the affirmative at step (318), a notification is provided of the existence of the inconsistency between the received statement and the first Historical Statement$_X$ (320). In an exemplary embodiment, the notification at step (320) is provided to the entity who targeted (e.g., had written, recorded, or dictated) the statement at the first recipient group. According to exemplary embodiments, the notification can be a pop-up text alert, an audio alert, a marking, a font change, striking through, underlining, highlighting, a proposed alternative statement, or other notice, indicia, or combination of notices and indicia bringing attention of the inconsistency to the targeting entity before the statement is transmitted to the first recipient group, etc. The described embodiments may be applied to other notification steps, such as at steps (416) and (512) of FIG. 4B and FIG. 5B, respectively, discussed below.

Following step (320), the AI platform proposes an alternative statement to the received statement, with the alternative statement being consistent with the received statement and the first Historical Statement$_X$ (322). In an embodiment, the cosine analysis is used to retrieve potentially contradictory statements. Similarly, in an embodiment, contradictory content words in a query statement and potentially contradictory statements are found using an antonym lexicon. For any antonym pairs found, candidate alternative statement can be generated by replacing the antonym in the query statement with a more general term, as described above with respect to the functionality of the director (158). In an embodiment, this modified statement can then be tested for consistency as described in FIG. 3, e.g. steps (316) and (318), and accepted as an alternative if it passes, or further modified if needed. In an exemplary embodiment, the proposed alternative statement is consistent with a plurality of, and optionally all of, the first Historical Statements. For example, step (322) may be deferred until all of the Historical Statements, e.g. $X_1$ through Historical Statement $X_{Total}$, have been processed. In an exemplary embodiment, the proposed alternative statement may modify the received contradictory statement by, for example, omitting one or more words from the received statement, weakening an opinion in the received statement through selection of less forceful words, replacement of conflicting content words with non-conflicting sibling or antonym terms, etc. The described embodiments may be applied to other alternative statement proposal steps, such as at steps (418) and (514) of FIGS. 4A and 4B and FIGS. 5A and 5B, respectively, discussed below.

After the issuance of the proposed alternative statement at step (322), following step (314), or following a negative response to the determination at step (318), the historical statement counting variable X is incremented (324). Thereafter, a decision is made to assess whether the received statement has been assessed in view of each of the historical statements, $X_{Total}$, (326). If the decision at step (326) is negative, the flowchart returns to step (312) for processing of the next historical statement. However, if the decision at step (326) is positive, then the method of the flowchart (300) concludes.

Figure 4A:
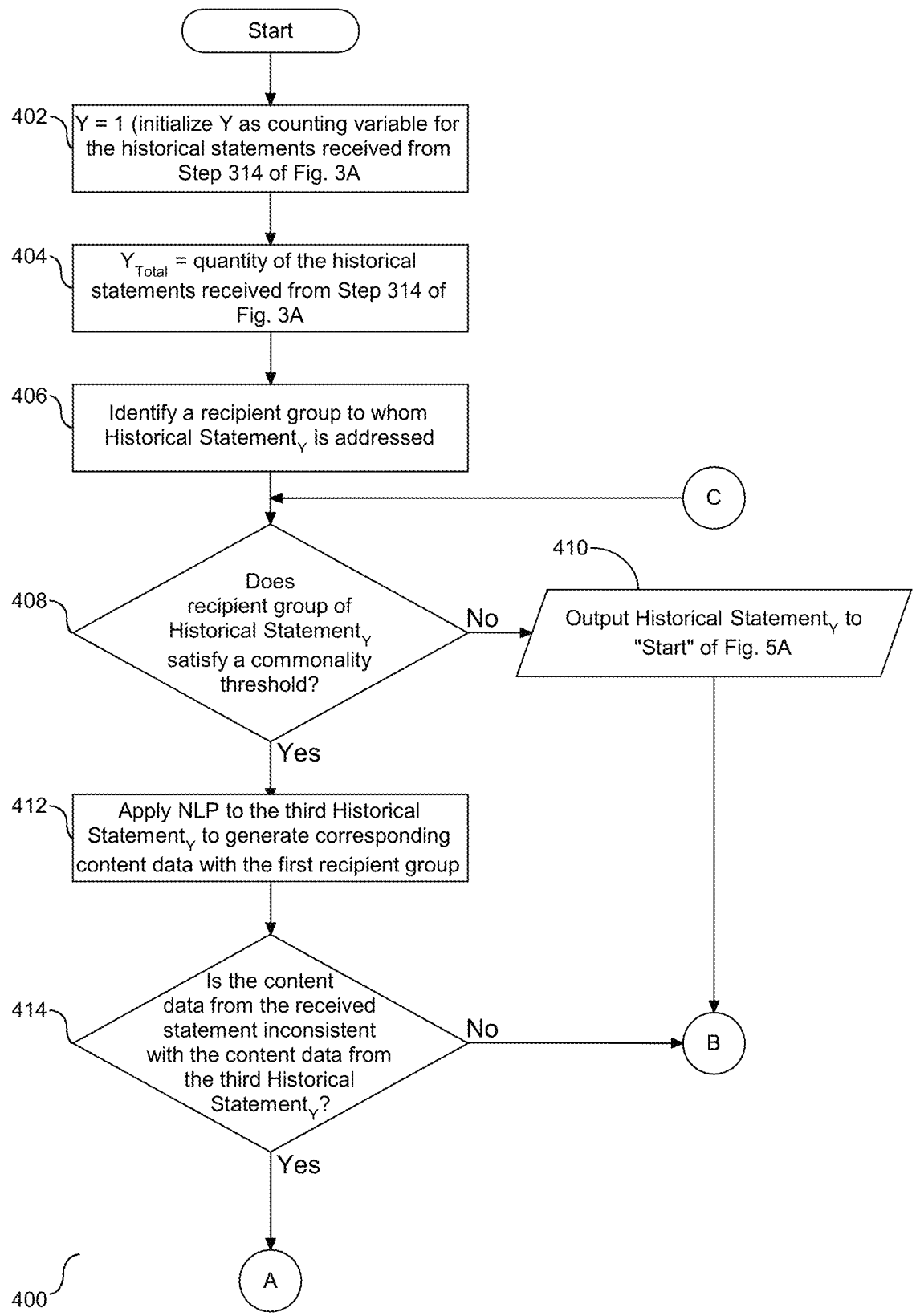
FIGS. 4A and 4B depict a flowchart illustrating an embodiment of a method of identifying an inconsistency between content data corresponding to a received statement and content data corresponding to a third historical statement, and providing notification of the inconsistency.
Figure 4B:
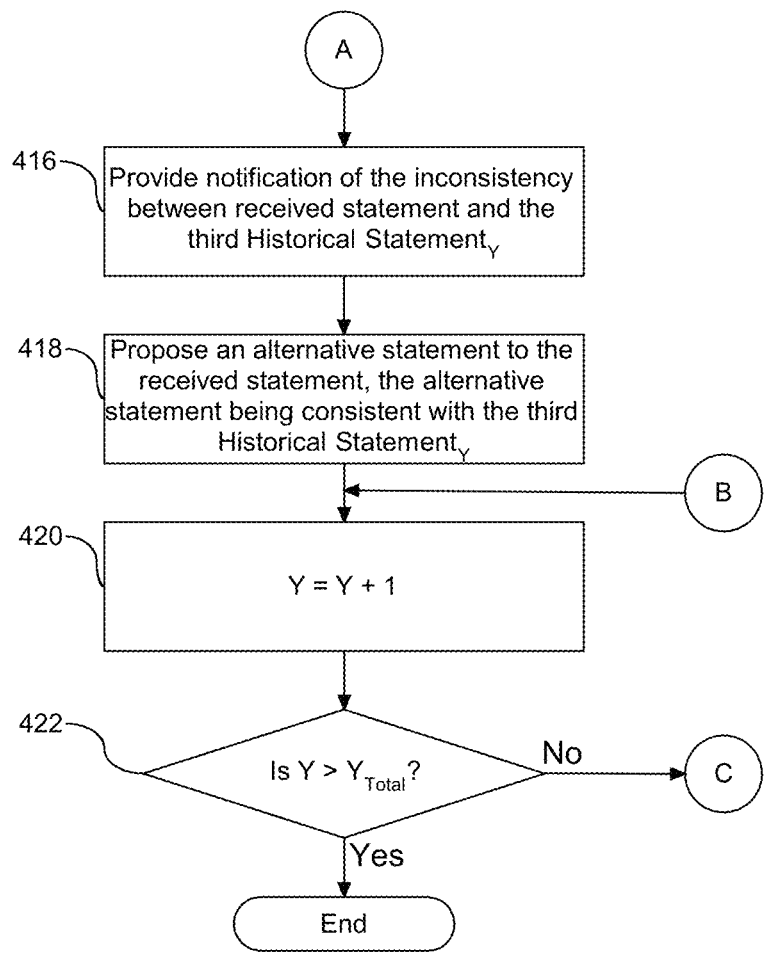

Referring to FIGS. 4A and 4B, a flow chart (400) is provided to illustrate a process for identifying an inconsistency between content data corresponding to a received statement and content data corresponding to a third historical statement, and providing notification of the inconsistency. As discussed above, if the decision at step (312) is answered in the negative, i.e., if the Historical Statement$_X$ is not addressed to the first recipient group and thus is not a "first historical statement," the Historical Statement$_X$ is sent to flowchart (400) of FIG. 4, per step (314) of FIG. 3A. At step (402) of FIG. 4A, a counting variable, Y, is initialized for the historical statement(s) received from step (314). The total number of historical statement(s) received from step (314) of FIG. 3A is assigned to the variable $Y_{Total}$ at step (404).

Step (406) involves identifying a recipient group to whom the Historical Statement$_Y$ is addressed. At step (408), a decision is made whether the identified recipient group to whom the Historical Statement$_Y$ is addressed satisfies a commonality threshold with the first recipient group. The commonality threshold determines the likelihood of transmission of information between the first recipient group and the third recipient group. As such, common membership is important, but the content or date of the message is only important in so far as communication between the first and second recipient groups about certain topics or only at certain dates. In an embodiment, the commonality threshold is satisfied where there is at least one recipient common to the first recipient group and the third recipient group. In another embodiment, the commonality threshold is satisfied where the content of the first historical statement(s) is related to the content of the third historical statement(s). In another embodiment, the commonality threshold is satisfied where the timing (e.g., date metadata, including date, hour, etc.) of the first historical statement(s) is close to the timing of the third historical statement(s). Probability determinations for the purpose of determining commonality threshold satisfaction may be based on, for example, topic, entity, date metadata, etc.

If an affirmative decision is made at step (408), i.e., if the Historical Statement$_Y$ is addressed to the third recipient group satisfying a commonality threshold with the first recipient group, then the process continues to step (412), discussed below. If the decision at step (408) is answered in the negative, e.g., if it is determined that the third recipient group to whom the Historical Statement$_Y$ is made does not satisfy the commonality threshold, such as in the case of a historical statement addressed to the second recipient group (discussed above in connection with FIGS. 3A and 3B), the Historical Statement$_Y$ is generated at output (410) and disregarded for the purposes of FIG. 4A, the Historical Statement$_Y$ is sent to the start of FIG. 5A (discussed below), and the process proceeds to step (420).

At step (412), natural language processing (NLP) is applied to the third Historical Statement$_Y$ to generate content data corresponding to the third Historical Statement$_Y$. At step (414), a decision is made whether the content data corresponding to the received statement is inconsistent with the content data corresponding to the third Historical Statement$_Y$. Contradiction detection decisions, such as according to step (414), can be made leveraging existing technologies such as an AI platform, such as the AI platform (150) of FIG. 1, or may involve a human-in-the-loop technique. The same or different embodiments as discussed above in connection with contradiction detection decision (318) may be practiced with respect to the received statement and the third Historical Statement$_Y$ in step (414).

If the decision at step (414) is answered in the negative, the process proceeds to step (420), discussed below. If the decision is answered in the affirmative at step (414), a notification is provided of the existence of the inconsistency between the received statement and the third Historical Statement$_Y$ at step (416). In an exemplary embodiment, the notification is provided to the entity who targeted (e.g., had written, recorded, or dictated) the targeting statement at the first recipient group. According to exemplary embodiments, the notification can be a pop-up text, an alert, an audio alert, a marking, indicia, a font change, striking through, underlining, highlighting, a proposed alternative statement, or otherwise providing notice of the inconsistency to the targeting entity before the contradictory statement is sent, etc. A proposed alternative statement to the received statement is provided in step (418), which may involve the same or different embodiments as discussed above in connection with step (322), except with regard to the received statement and the third Historical Statement$_Y$.

At step (420), the historical statement counting variable Y is incremented, and a decision is made at step (422) whether the incremented variable Y is greater than the total number of historical statements received from flowchart (300), i.e., $Y_{Total}$. If the decision at step (422) is negative, the flowchart returns to step (408) for processing of the next Historical Statement$_{Y+1}$. If the decision at step (422) is positive, then the method of the flowchart (400) concludes.

Figure 5A:
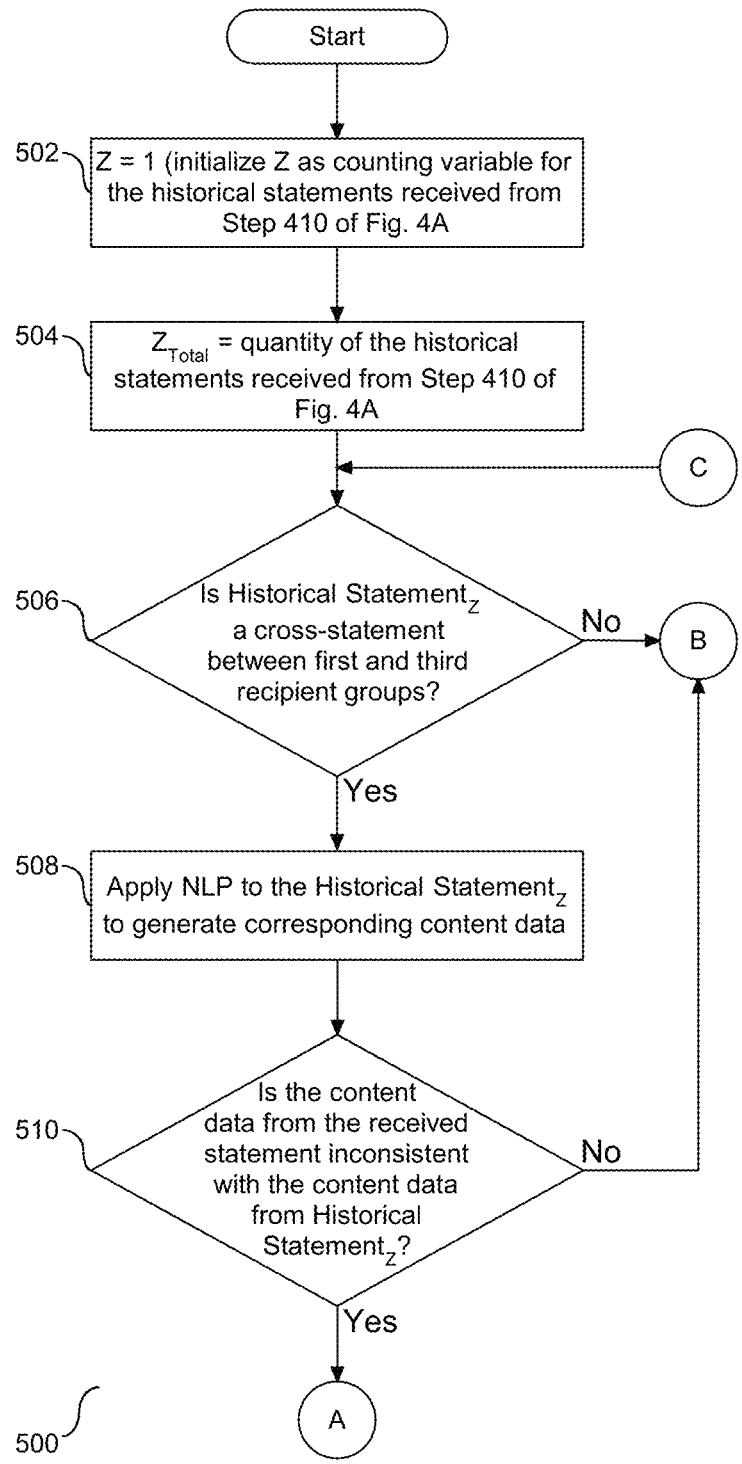
FIGS. 5A and 5B depict a flowchart illustrating an embodiment of identifying an inconsistency between content data corresponding to a received statement and content data corresponding to a historical cross-statement, and providing notification of the inconsistency.
Figure 5B:
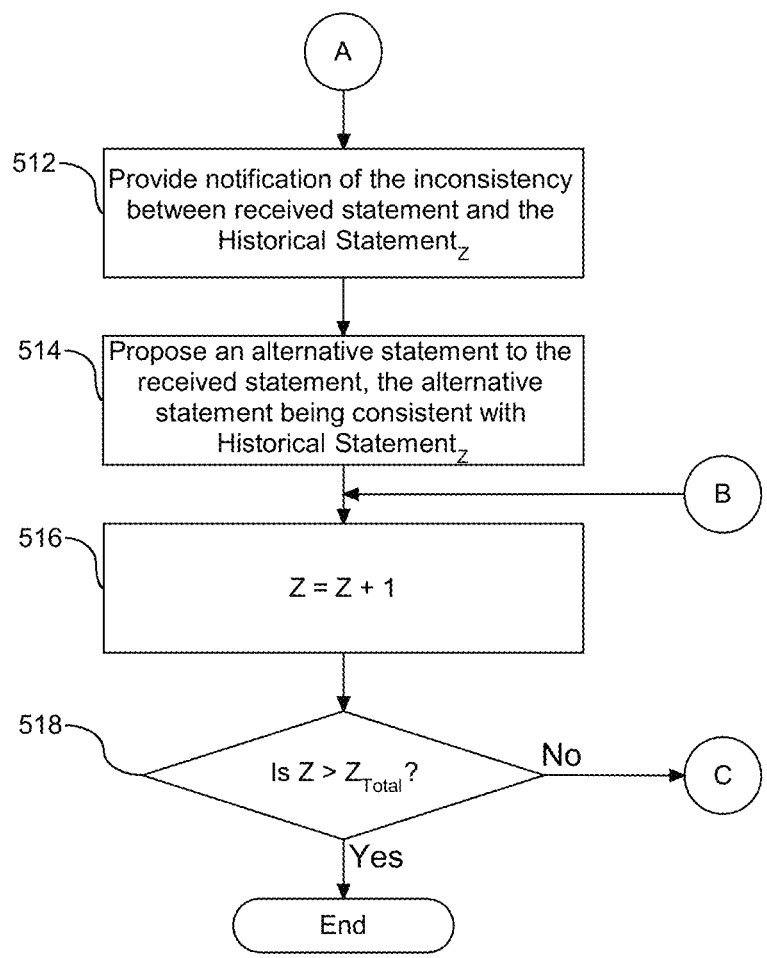

Referring to FIGS. 5A and 5B, a flow chart (500) is provided to illustrate a process identifying an inconsistency between content data corresponding to a received statement and content data corresponding to a historical cross-statement, and providing notification of the inconsistency. As discussed above, if the decision at step (408) is answered in the negative, i.e., if the Historical Statement$_Y$ is not addressed to a third recipient group satisfying a commonality threshold with the first recipient group, and thus is not a "third historical statement," the Historical Statement$_Y$ is sent to step (502) of flowchart (500) of FIGS. 5A and 5B, per step (410) of FIG. 4A. At step (502) of FIGS. 5A and 5B, a counting variable "Z" is initialized for the historical statement(s) received from step (410). The total number of historical statement(s) received from step (410) of FIG. 4A is assigned to the variable $Z_{Total}$ at step (504).

At step (506), a decision is made whether Historical Statement$_Z$ is a cross statement exchanged between the first recipient group and the third recipient group, e.g., sent from the first recipient group to the third recipient group or from the third recipient group to the first recipient group. The user typically does not know that any given statement is a cross statement between two recipient groups. Rather, they only know the likelihood of any statement to the first group being transmitted to the second group, and whether that likelihood is over the commonality threshold. If the decision is answered in the negative, e.g., if it is determined that there is an absence of a cross-statement between the first recipient group and the third recipient group, the Historical Statement$_Z$ is disregarded for the purposes of FIGS. 5A and 5B and the process proceeds to step (516), discussed below.

However, if an affirmative decision is made, i.e., if the Historical Statement$_Z$ is a cross-statement between the first recipient group and the third recipient group, at step (506), natural language processing (NLP) is applied to the Historical Cross-Statement$_Z$ at step (508) to generate content data corresponding to the Historical Cross-Statement$_Z$. At step (510), a decision is made whether the content data corresponding to the received statement is inconsistent with the content data corresponding to the Historical Cross-Statement$_Z$. Contradiction detection decisions, such as according to step (510), can be made leveraging existing technologies such as an AI platform or may involve a human-in-the-loop technique. The same or different embodiments as discussed above in connection with contradiction detection decision (318) may be practiced in step (510) with respect to the received statement and the Historical Cross-Statement$_Z$.

If the decision at step (510) is answered in the negative, the process proceeds to step (516), discussed below. However, if the decision is answered in the affirmative at step (510), a notification is provided of the existence of the inconsistency between the received statement and the Historical Cross-Statement$_Z$ (512). In an exemplary embodiment, the notification is provided to the entity who targeted (e.g., had written, recorded, or dictated) the statement at the first recipient group. According to exemplary embodiments, the notification can be a pop-up text alert, an audio alert, a marking, a font change, striking through, underlining, highlighting, a proposed alternative statement, or other notice or combination of notices bringing the inconsistency to the targeting entity before the contradictory statement is transmitted to the first recipient group. A proposed alternative statement to the received statement is provided in step (514), which may involve the same or different embodiments as discussed above in connection with step (322), except with regard to the received statement and the Historical Cross-Statement$_Z$.

At step (516), the historical statement counting variable Z is incremented, and a decision is made at step (518) whether each of historical statements received from flowchart (400), i.e., $Z_{Total}$, have been processed. If the decision at step (518) is negative, the flowchart returns to step (506) for processing of the next Cross-Statement$_{Z+1}$. However, if the decision at step (518) is positive, then the method of the flowchart (500) concludes.

Aspects of the received statement and historical statement processing shown in FIGS. 1-5B, employ one or more functional tools, as shown and described in FIG. 1. Aspects of the functional tools (152), (154), (156), and (158) and their associated functionality may be embodied in a computer system/server in a single location, or in an embodiment, may be configured in a cloud based system (610) sharing computing resources. With references to FIG. 6, a block diagram (600) is provided illustrating an example of a computer system/server (602), hereinafter referred to as a host (602) in communication with a cloud based support system, to implement the processes described above with respect to FIGS. 3A-5B. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instruction(s), such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
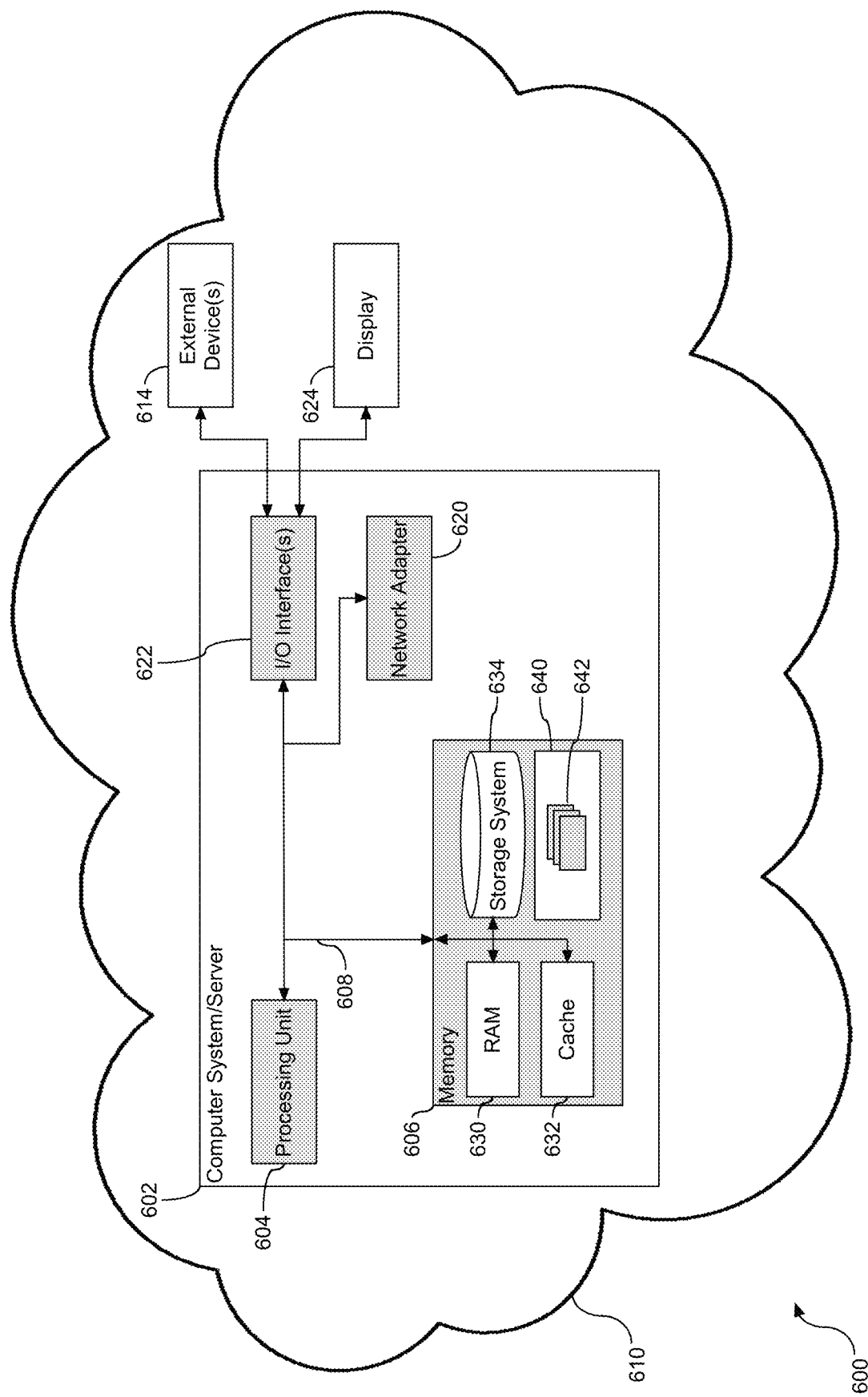
FIG. 6 depicts a block diagram illustrating an example of a computer system of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), e.g. hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to leverage logic, e.g. temporal logic, to assess a statement for contradiction detection and provide a notification of the inconsistency. For example, the set of program modules (642) may include the modules (152), (154), (156) and director (158) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In an embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instruction(s) for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In an embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
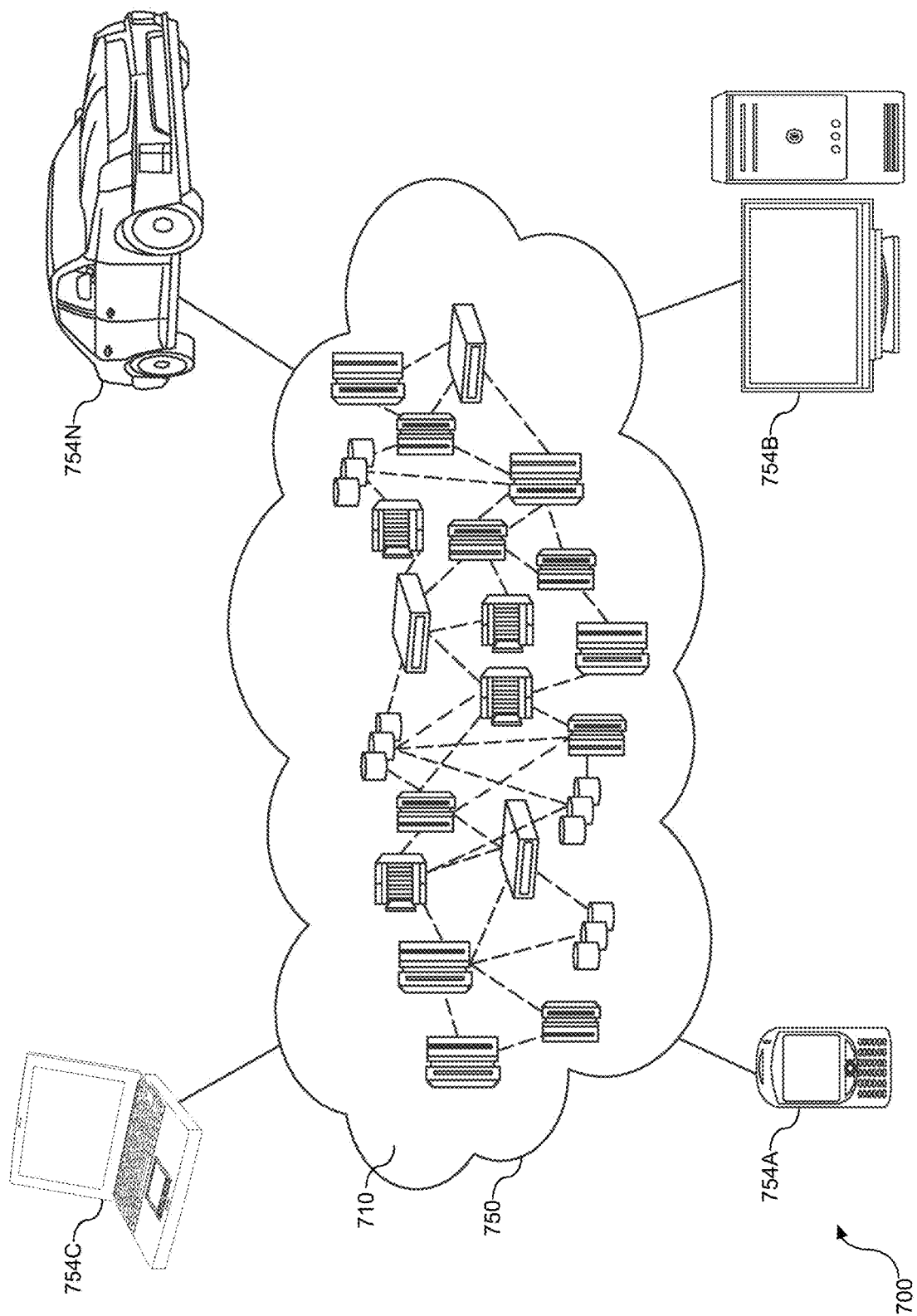
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
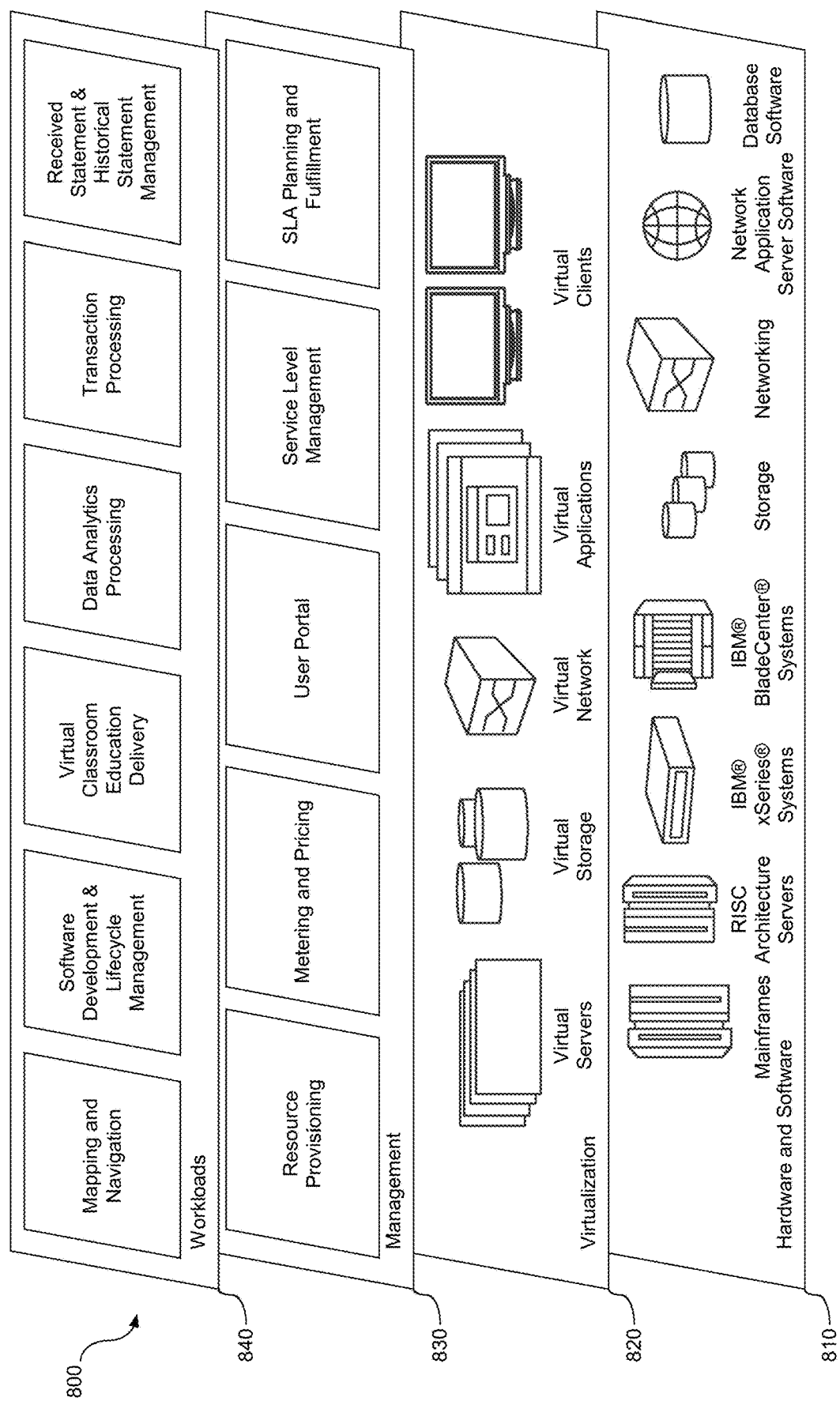
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In an example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In an example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and received statement and historical statement management.

It will be appreciated that there is disclosed herein a system, method, apparatus, and computer program product for contradiction detection between a received statement to a recipient group of one or more recipients or members and one or more historical statements to the same recipient group, and in exemplary embodiments providing notification of the contradiction and optionally a proposed alternative statement.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to resolve interrogatories with intent identification and a corresponding response related to the identified intent.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order or other alternative order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. In particular, the natural language processing may be carried out by different computing platforms or across multiple devices. Furthermore, the data storage and/or corpus may be localized, remote, or spread across multiple systems. Accordingly, the scope of protection of the embodiments is limited only by the following claims and their equivalents.

What is claimed is:

1. A computer system comprising:
    a processing unit operatively coupled to memory to receive a statement targeting a first recipient group and to access a corpus of historical statements, the corpus of historical statements comprising:
        at least one first historical statement addressed to the first recipient group;
        at least one second historical statement addressed to a second recipient group not targeted by the received statement; and
        optionally at least one third historical statement addressed to a third recipient group, at least one recipient of which is not targeted by the received statement;
    a match manager operatively coupled to the processing unit, the match manager to:
        determine a match between the first recipient group targeted by the received statement and the first recipient group to which the at least one first historical statement is addressed and select the at least one first historical statement based on the match;
        determine an absence of a match between the first recipient group targeted by the received statement and the second recipient group to which the at least one second historical statement is addressed and disregarding the at least one second historical statement based on the absence of the match;
        optionally determine that the third recipient group satisfies a commonality threshold with the first recipient group and optionally select the third historical statement based on satisfaction of the commonality threshold;
        optionally identify at least one historical cross-statement between the first recipient group and the third recipient group satisfying the commonality threshold and optionally select the at least one historical cross-statement;
    an artificial intelligence (AI) platform in communication with the processing unit, comprising:
        a natural language (NL) manager to apply natural language processing (NLP) to the received statement, the selected at least one first historical statement, optionally the at least one third historical statement, and optionally the at least one historical cross-statement, to generate corresponding content data;
        an AI manager to assess the content data corresponding to the received statement for an inconsistency with the content data corresponding to the selected at least one first historical statement, the optionally selected at least one third historical statement, the optionally selected at least one historical cross-statement, or any combination thereof; and
        a director to provide a notification of the inconsistency.

2. The computer system of claim 1, wherein the inconsistency is between the content data corresponding to the received statement and the content data corresponding to the selected at least one first historical statement.

3. The computer system of claim 2, further comprising the director to propose an alternative statement to the received statement, the alternative statement being consistent with the content data corresponding to the selected at least one first historical statement.

4. The computer system of claim 1, wherein:
    the corpus of historical statements comprises the at least one third historical statement to the third recipient group, at least one recipient of which is not targeted by the received statement;
    the match manager to determine that the third recipient group satisfies the commonality threshold with the first recipient group and select the third historical statement based on satisfaction of the commonality threshold;
    the NL manager to apply NLP to the selected at least one third historical statement; and
    the inconsistency is between the content data corresponding to the received statement and the content data corresponding to the selected at least one third historical statement.

5. The computer system of claim 4, further comprising the director to propose an alternative statement to the received statement, the alternative statement being consistent with the content data corresponding to the selected at least one third historical statement.

6. The computer system of claim 1, wherein:
    the corpus of historical statements comprises the at least one third historical statement to the third recipient group, at least one recipient of which is not targeted by the received statement;

the match manager to determine that the third recipient group satisfies the commonality threshold with the first recipient group;

the match manager to identify the at least one historical cross-statement between the first recipient group and the third recipient group;

the NLP manager to apply NLP to the selected at least one historical cross-statement; and the inconsistency is between the content data corresponding to the received statement and the content data corresponding to the selected at least one historical cross-statement.

7. The computer system of claim 6, further comprising the director to propose an alternative statement to the received statement, the alternative statement being consistent with the content data corresponding to the selected at least one historical cross-statement.

8. A computer program product comprising a computer readable storage medium having program code embodied therewith, the program code executable by a processor to:
receive a statement targeting a first recipient group;
access a corpus of historical statements, the corpus of historical statements comprising:
at least one first historical statement addressed to the first recipient group;
at least one second historical statement addressed to a second recipient group not targeted by the received statement; and
optionally at least one third historical statement addressed to a third recipient group, at least one recipient of which is not targeted by the received statement;
determine a match between the first recipient group targeted by the received statement and the first recipient group to which the at least one first historical statement is addressed and select the at least one first historical statement based on the match;
determine an absence of a match between the first recipient group targeted by the received statement and the second recipient group to which the at least one second historical statement is addressed and disregard the at least one second historical statement based on the absence of the match;
optionally determine that the third recipient group satisfies a commonality threshold with the first recipient group and optionally select the third historical statement based on satisfaction of the commonality threshold;
optionally identify at least one historical cross-statement between the first recipient group and the third recipient group satisfying the commonality threshold and optionally select the at least one historical cross-statement;
apply natural language processing (NLP) to the received statement, the selected at least one first historical statement, optionally the at least one third historical statement, and optionally the at least one historical cross-statement to generate corresponding content data;
assess the content data corresponding to the received statement for an inconsistency with the content data corresponding to the selected at least one first historical statement, the optionally selected at least one third historical statement, the optionally selected at least one historical cross-statement, or any combination thereof; and
provide a notification of the inconsistency.

9. The computer program product of claim 8, wherein the inconsistency is between the content data corresponding to the received statement and the content data corresponding to the selected at least one first historical statement.

10. The computer program product of claim 9, further comprising program code to propose an alternative statement to the received statement, the alternative statement being consistent with the content data corresponding to the selected at least one first historical statement.

11. The computer program product of claim 8, wherein:
the corpus of historical statements comprises the at least one third historical statement to the third recipient group; and
further comprising program code to:
determine that the third recipient group satisfies the commonality threshold with the first recipient group and select the third historical statement based on satisfaction of the commonality threshold;
apply NLP to the selected at least one third historical statement; and
the inconsistency is between the content data corresponding to the received statement and the content data corresponding to the selected at least one third historical statement.

12. The computer program product of claim 11, further comprising program code to propose an alternative statement to the received statement, the alternative statement being consistent with the content data corresponding to the selected at least one first historical statement.

13. The computer program product of claim 8, wherein:
the corpus of historical statements comprises the at least one third historical statement to the third recipient group, at least one recipient of which is not targeted by the received statement; and
further comprising program code to:
determine that the third recipient group satisfies the commonality threshold with the first recipient group;
identify the at least one historical cross-statement between the first recipient group and the third recipient group;
apply NLP to the selected at least one historical cross-statement; and
wherein the inconsistency is between the content data corresponding to the received statement and the content data corresponding to the selected at least one historical cross-statement.

14. A machine-implemented method comprising:
receiving a statement of an entity targeting a first recipient group;
accessing, by a processor of a computer device, a corpus of historical statements, the corpus of historical statements comprising:
at least one first historical statement addressed to the first recipient group;
at least one second historical statement addressed to a second recipient group not targeted by the received statement; and
optionally at least one third historical statement addressed to a third recipient group, at least one recipient of which is not targeted by the received statement;
determining, by the processor, a match between the first recipient group targeted by the received statement and the first recipient group to which the at least one first historical statement is addressed and selecting the at least one first historical statement based on the match;
determining, by the processor, an absence of a match between the first recipient group targeted by the received statement and the second recipient group to which the at least one second historical statement is addressed and disregarding the at least one second historical statement based on the absence of the match;

optionally determining, by the processor, that the third recipient group satisfies a commonality threshold with the first recipient group and optionally selecting the third historical statement based on satisfaction of the commonality threshold;

optionally identifying, by the processor, at least one historical cross-statement between the first recipient group and the third recipient group satisfying the commonality threshold and optionally selecting the at least one historical cross-statement;

applying natural language processing (NLP) to the received statement, the selected at least one first historical statement, optionally the at least one third historical statement, and optionally the at least one historical cross-statement to generate corresponding content data;

applying, by the processor, the content data to an artificial intelligence (AI) platform, the applying comprising assessing the content data corresponding to the received statement for an inconsistency with the content data corresponding to the selected at least one first historical statement, the optionally selected at least one third historical statement, the optionally selected at least one historical cross-statement, or any combination thereof; and providing, by the processor, a notification of the inconsistency.

15. The machine-implemented method of claim 14, wherein the inconsistency is between the content data corresponding to the received statement and the content data corresponding to the selected at least one first historical statement.

16. The machine-implemented method of claim 15, further comprising applying the content data to the AI platform to propose an alternative statement to the received statement, the alternative statement being consistent with the content data corresponding to the selected at least one first historical statement.

17. The machine-implemented method of claim 14, wherein:
the corpus of historical statements comprises the at least one third historical statement to the third recipient group;
the machine-implemented method comprises the determining that the third recipient group satisfies the commonality threshold with the first recipient group and the selecting the third historical statement based on satisfaction of the commonality threshold;
the inconsistency is between the content data corresponding to the received statement and the content data corresponding to the selected at least one third historical statement.

18. The machine-implemented method of claim 17, further comprising applying the content data to the AI platform to propose an alternative statement to the received statement, the alternative statement being consistent with the content data corresponding to the selected at least one third historical statement.

19. The machine-implemented method of claim 14, wherein:
the corpus of historical statements comprises the at least one third historical statement to the third recipient group, at least one recipient of which is not targeted by the received statement; and
the inconsistency is between the content data corresponding to the received statement and the content data corresponding to the selected at least one historical cross-statement.

20. The machine-implemented method of claim 19, further comprising applying the content data to the AI platform to propose an alternative statement to the received statement, the alternative statement being consistent with the content data corresponding to the selected at least one historical cross-statement.

* * * * *